Patented Aug. 3, 1926.

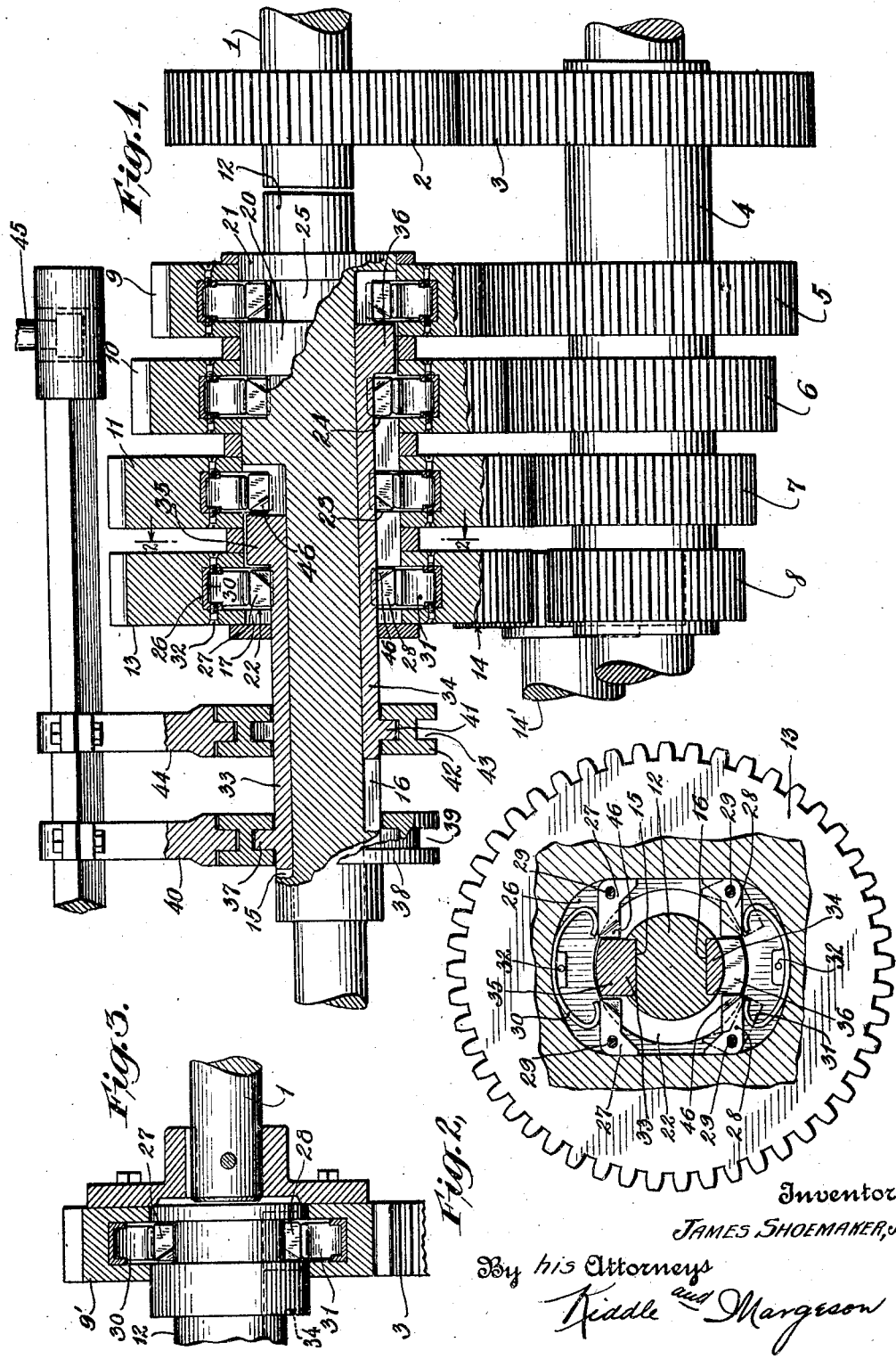

1,594,384

UNITED STATES PATENT OFFICE.

JAMES SHOEMAKER, JR., OF TUCKAHOE, NEW JERSEY.

CLUTCH MECHANISM.

Application filed April 23, 1924. Serial No. 708,377.

My invention relates to clutch mechanism and is particularly adapted for use in variable speed transmissions for motor vehicles, such as automobiles, trucks and the like, and has for an object the elimination of gear clashing when changing speeds and permits of speed changes at will at any and all gear speeds and on hills in either direction.

A further object of my invention is the provision of a clutch mechanism particularly adapted for use in variable speed transmission mechanisms, in which no condition of motor vehicle operation will interfere with the quick and positive placing of the gear shift lever to the desired position required for effecting the desired speed change.

A further object of my invention is the provision of clutch mechanism such as above referred to and adapted for use in connection with variable speed transmission mechanism of the type in which the speed gears are loosely mounted on the propeller shaft and are always rotating during operation of the engine, my improved clutch mechanism providing means whereby any speed gear may be readily coupled or clutched or locked to the propeller shaft as desired.

A further object of my invention is the provision of a clutch mechanism for use in variable speed transmissions whereby it is practically impossible, when making a speed change, to fail to bring the desired speed gear into operation.

I might mention also that in my improved clutch mechanism the connection between the key and speed gear is effected positively and no springs or other resilient devices need be relied upon for effecting the clutching connection.

In the accompanying drawings I have shown one embodiment of my invention.

Fig. 1 being a part sectional elevational view of a variable speed transmission embodying my improved clutch mechanism;

Fig. 2 being a sectional view taken on the line 2—2 of Fig. 1 and showing the construction of one of the speed gears and the clutch mechanism employed for clutching the same to the propeller shaft;

Fig. 3 is a modification of the apparatus of Fig. 1.

Referring to the drawings in detail, 1 designates the usual clutch shaft adapted to be clutched to the crank shaft of an internal combustion engine, for example, in the usual way. Inasmuch, however, as this feature forms no part of the present invention, and as this construction is well known, I have not deemed it necessary to illustrate it in the accompanying drawings.

Mounted on the clutch shaft 1 and rigid therewith so as always to rotate with it, is a clutch gear 2. This gear is in constant mesh with a gear 3 mounted on and rigidly secured to a counter-shaft 4. This counter-shaft also carries four other gears, all keyed or otherwise rigidly attached thereto, a high speed counter-gear 5, intermediate speed counter-gear 6, a low speed counter-gear 7, and reverse counter-gear 8. These gears rotate constantly when the apparatus is in operation, being driven through the clutch gear 2 and the counter-gear 3.

The counter-gears 5, 6 and 7 are in constant mesh with high speed gear 9, intermediate speed gear 10 and low speed gear 11, respectively, these speed gears being loosely mounted on the propeller shaft 12, which is to be driven through my improved apparatus. The propeller shaft also has a reverse gear 13 loosely mounted thereon and meshing with an intermediate gear 14 on a shaft 14', this intermediate gear in turn meshing with the reverse counter-gear 8, already referred to. By this arrangement the direction of rotation of the reverse gear 13 is opposite to that of the speed gears 9, 10 and 11, so that when the gear 13 is locked to the propeller shaft in a manner presently to be described the direction of rotation of the propeller shaft likewise will be reversed.

The propeller shaft 12 is of a particular construction and is provided with two longitudinally extending key-ways 15 and 16, diametrically opposed to each other, as seen in Fig. 2. The shaft 12 is also provided with spaced bearing portions, 17, 18, 19, 20 and 21, constituting bearings for the speed gears 13, 11, 10 and 9, respectively, the reverse gear 13 being supported on the bearings 17 and 18, the low speed gear 11 on the bearings 18 and 19, the intermediate gear 10 on the bearings 19 and 20, while the high speed gear 9 is supported on the bearings 20 and 21. The spans between the bearings have been designated 22, 23, 24 and 25.

The speed gears 9, 10, 11 and 13 are similar in construction, so that a detailed description of one of these gears will suffice for them all, and for illustrative purposes I have shown the reverse gear 13 in detail in Fig. 2.

Referring to this figure of the drawing, it will be seen that the interior of the gear is milled out around the centre thereof, as indicated at 26, this milled-out portion when the gear is in place on the propeller shaft 12 surrounding or registering with the space 22 between the bearings 17 and 18. In the space 26, I provide a pair of driving lugs 27 and a pair of driving lugs 28. Each of these lugs is pivoted on a pin 29 and is in the form of a bell crank lever, and when the lugs are in the position shown in full lines in Fig. 2 the end of one arm of each of the lugs 27 extends to the edges of the key-way 15, while the end of one arm of each of the lugs 28 extends to the edges of the key-way 16. The other arm of each of the driving lugs engages the side of the milled-out slot 26 to take the thrust of the lug when a gear is locked to the propeller shaft.

To hold the lugs 27 in clutching or coupling position I provide a spring 30, while the lugs 28 are held in driving or coupling position by means of a similar spring 31. These springs are secured to the walls of the milled-out slot 26 by means of suitable screws or other securing means 32. I preferably provide lost motion between the driving lugs 27 and 28 and their respective pivot pins 29, so that in operation these pins will not be sheared off.

As I have above pointed out, each of the speed gears is loosely mounted on the propeller shaft 12, and it is the purpose of my invention to provide a simple means for positively attaching any desired speed gear to the propeller shaft. To this end, therefore, the key-ways 15 and 16 in the shaft 12 are provided with keys 33 and 34, these keys being so mounted in the key-way as to be slidable longitudinally thereof and of the shaft 12, but to be held against any rotary movement relatively to the shaft.

The key 33 is provided with an enlarged end or nose designated 35, this enlarged portion when the lug is in operation engaging the gear to be driven. The other key 34 is similar in construction to the key 33, being provided with an enlarged end or nose 36. This key lies in the key-way or slot 16 and hence is diametrically opposite the key 33.

With the transmission in neutral position as indicated in Fig. 1, for instance, it will be seen that the enlarged portions 35 and 36 of my improved clutching or locking keys are in a position to permit the speed gears to freely rotate on the propeller shaft.

The key 33 at the end opposite to the nose 35 is provided with a lateral projection 37, received by a grooved ring 38 which surrounds the shaft 12, this ring permitting the key to rotate freely with the shaft 12 when the shaft is rotating. The periphery of this ring is provided with a groove 39, receiving the lower end of a shifting arm 40. The key 34 is provided with a similar projection 41, received by a grooved ring 42 surrounding the shaft 12, the periphery of this ring being provided with a groove 43, receiving the lower end of a shift arm 44. The arms 40 and 44 are adapted to be shifted by a shift lever 45, the lower end of which is adapted to engage the arm 40 or the arm 44, as the case may be, to move the key 33 or the key 34 lengthwise of the propeller shaft 12.

In operation, to couple the shaft 1 to the shaft 12, assuming that the gears 9, 10, 11 and 13 are rotating freely on the shaft 12, the shift lever 45 is operated to slide the key 33 to the right as viewed in Fig. 1, to bring the nose 35 into the space 23 between the bearings 18 and 19 on the shaft 12 and hence into the milled-out slot 26 in the gear 11. In moving to this position, should the gear not be exactly in proper position, the key will strike the bevelled face 46 of the driving lug and raise the lug against the action of its spring until the gear moves to proper position, whereupon the key will lock the gear to the shaft, the two lugs of one pair of driving lugs engaging each side of the key.

The gear 11 is now positively locked to the shaft 12. The gear 10 may next be locked to the shaft 12 by operating the gear shift lever 45 in a direction to withdraw the key 33 from the gear 11 and to move the key 34 to the left, as viewed in Fig. 1, to bring the nose 36 of this key into locking position relatively to the gear 10. The gear 10 is now positively locked to the propeller shaft.

The gear 9 may be coupled to the propeller shaft by merely operating the gear shift lever 45 to move the key 34 to the right as viewed in Fig. 1, out of engagement with the gear 10 and into operative position relatively to the high speed gear 9.

If it is desired to reverse the direction of rotation of the shaft 12 it is merely necessary to operate the gear shift lever 45 so as to move the key 33 to the left, as viewed in Fig. 1, to bring the nose of the same into coupling engagement or position relatively to the reversing gear 13. This couples the gear 13 to the shaft 12 and as this gear is rotating, due to the intermediate gear 14, in the proper direction for reverse the direction of rotation of the propeller shaft 12 will be reversed.

It will be seen from the foregoing, therefore, that I have provided clutch mechanism whereby a desired gear of a series may be selected and coupled to a rotating shaft. It will be seen also that in my improved apparatus this operation is effected through the medium of two keys, each of which is adapted to be moved longitudinally of the propeller shaft into coupling engagement or position relatively to the gear which is to be coupled to the shaft, my improved apparatus being so arranged that only this simple longitudinal movement of the keys is necessary to effect the desired result.

It is to be understood that the mechanism will run in an oil bath enclosed in a gear casing of some kind.

I may dispense with the counter-gear 5 if desired and couple direct to the shaft 1, and such an apparatus has been shown in Fig. 3. Referring to this drawing in detail, 9' designates a member which may be substituted for the gear 9, this gear being provided with interior mechanism similar to the mechanism in the interior of the high speed gear. The member 9' is rigid with the shaft 1. By moving the key 34 to the right until it engages the mechanism on the interior of the member 9' the shaft 12 is locked to the clutch shaft direct.

While I have described a specific embodiment of my invention, it is to be understood that the details of construction may be varied somewhat from that above referred to within the scope of my invention.

What I claim is:

1. In combination a shaft, a key way extending longitudinally thereof, spaced bearings on said shaft, a gear freely rotatable on said bearings, driving lugs within said gear, means for bringing the ends of said lugs into alignment with said key way, a key in said key way having a portion extending radially of said shaft and projecting beyond the periphery thereof, and means for sliding said key along its key way longitudinally of the shaft to position the projecting portion of the key in the space between said bearings and between a pair of said driving lugs to clutch the gear to the shaft.

2. In combination a clutch mechanism comprising a shaft, a gear mounted thereon, a key slidable longitudinally of said shaft and held against rotation relatively to the shaft, a projection adjacent one end of said key and extending beyond the surface of the shaft, and pivoted driving lugs within said gear, a spring co-operating with each of said lugs to hold the same in operative position, and a key actuating lever for sliding said key longitudinally of said shaft to bring the projecting portion of the key between the driving lugs to clutch the gear to the shaft.

3. In combination a shaft, a gear loosely mounted thereon, a pair of driving lugs mounted within said gear, each lug comprising two integral arms pivoted to the gear, a key carried by said shaft and slidable longitudinally thereof and held against rotation relatively to the shaft, and means for moving said key into position between said lugs to clutch the gear to the shaft with one arm of each lug engaging the gear to take the thrust of the key.

4. A speed gear for a variable speed transmission comprising a body portion provided with an internal cut-out portion, driving lugs lying within the cut-out portion and pivoted to the gear body, and springs for holding said lugs in operative position.

5. A speed gear for a variable speed transmission comprising a gear body cut away to provide an internal recess about the axis of the gear, two pairs of driving lugs in said recess and pivotally attached to the walls of the recess, the lugs of each pair being spaced from and opposite each other, and springs for maintaining the lugs of each pair in operative relation to each other.

6. A speed gear for variable speed transmission comprising a gear body cut away internally to provide a recess, two pairs of driving lugs disposed in said recess, a pivot for each lug, and a spring for each pair of lugs to hold one arm of each lug in engagement with the walls of the recess.

This specification signed this 19th day of April, 1924.

JAMES SHOEMAKER, Jr.